No. 673,395. Patented May 7, 1901.
C. HILL & F. MITCHELL.
PEDAL AND CRANK HEAD FOR CYCLES.
(Application filed Sept. 29, 1899.)
(No Model.)
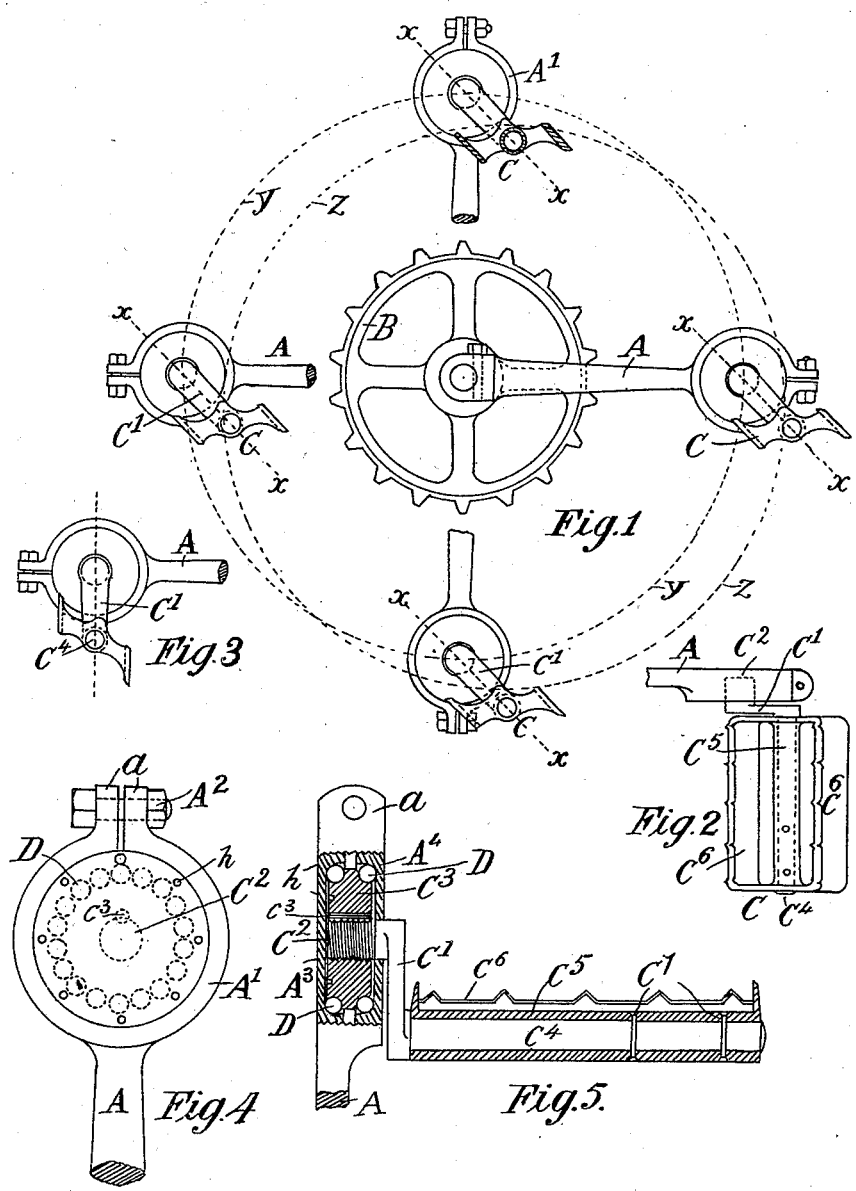

UNITED STATES PATENT OFFICE.

CHARLES HILL AND FREDERICK MITCHELL, OF BALLARAT, VICTORIA.

PEDAL AND CRANK-HEAD FOR CYCLES.

SPECIFICATION forming part of Letters Patent No. 673,395, dated May 7, 1901.

Application filed September 29, 1899. Serial No. 732,105. (No model.)

*To all whom it may concern:*

Be it known that we, CHARLES HILL and FREDERICK MITCHELL, subjects of the King of Great Britain, and residents of Ballarat, Victoria, have invented certain new and useful Improvements in Pedal and Crank-Heads for Cycles, of which the following is a specification.

This invention relates to improvements in the pedal and crank-head of cycles having pedals of the stepped or swinging type. In our invention the operative center line of the pedal lies preferably at an angle of about forty-five degrees from the vertical center of crank-head or in any case at an angle lying radially forward and downward from said center at every point of the revolution of the crank-head. Also the foot-bars of pedal lie equidistant at each side of the said operative center line; and the improvements consist in the novel construction of said pedal in order to allow the hind foot rest or bar of pedal when in use to be about directly under the center pin of crank-head, and thus by carrying the rider's foot forward of the crank-head center the operative power of the pedals upon the crank-arms is materially increased. This construction of combined pedal and crank-head is quite as efficient for back-pedaling.

The invention will now be described, aided by a reference to the accompanying drawings, in which—

Figure 1 is a view showing the crank lying horizontal, with its pedal in its forward operative position and also showing the operative position of the pedal when at the lowest, backmost, and topmost points of its rotation; Fig. 2, a plan of the pedal when in its operative position, as shown in Fig. 1, and supported on crank-head; Fig. 3, a side view of pedal as it will hang from crank-head when not used; and Figs. 4 and 5 are details, shown to a larger scale, of the combined pedal and crank-head.

A is the crank-arm, secured, as usual, on the axle-pin adjacent to the chain-sprocket B, and C is the pedal, composed of an angularly-arranged arm C', provided at its top end with a short projecting screwed pin $C^2$, which is firmly secured to a coned disk $C^3$ and having projecting in a reverse direction from its bottom end a longer fixed pin or bar $C^4$, to which the foot-rests of pedal are rigidly secured. The pedal, as shown in the drawings, has the central barrel $C^5$ of the pedal-frame $C^6$ rigidly secured by rivets or pins $C^7$ on said pin or bar $C^4$. The front and back foot-rest bars of the pedal-frame $C^6$ are shown set at an angle of about forty-five degrees or in a direct line with the force when applied to the pedals. The dotted line marked $x\ x$ is what we term the "operative" center line of force as applied to the pedal. The crank-arm A has an enlarged split eye A', provided with lugs $a$ and the adjusting or clamping bolt and nut $A^2$. Said eye is threaded internally to receive the screwed cones $A^3$ and $A^4$, between which and the cone-disk $C^3$ the balls D are located, and each of the said cones has holes $h$ in them to receive a key or other device for screwing them into position or for the purpose of adjustment. $c^3$ is a lock-pin between cone-disk $C^3$ and pin $C^2$. It will be noticed that in this construction of ball-bearing the cone $C^3$ has no support whatever, save the balls D, and hence rotates with a minimum of friction, and also that the circles described by the center of crank-head and the operative center of pedal and shown by dotted lines marked $y$ and $z$, respectively, are of the same diameter and lie eccentric to one another, the latter extending farther forward and downward than the circle of crank-head center, and thus applying increased power thereto where it is most effective.

A pedal may be constructed in accordance with this invention and be swung at one or both its sides from a pin secured in the crank-head.

The utility of having the barrel of the pedal-frame rigidly secured to the pedal shaft or bar $C^4$ is that if it were not for said parts being fixed to one another when the rider's feet were placed on the pedals the crank-arm C' would hang down at about vertical, as per Fig. 3, and the pedal-frame $C^6$ would stand at about horizontal, and so the whole object of the invention would be defeated unless the pedals were guided to their angular position by the feet of rider. Now, by the arm $c'$ and pedal-frame C being fixed together at the forwardly-inclined angular position shown, upon the rider giving the requisite downward pressure with his feet the pedals naturally assume the angular position indicated by the lines $x\ x$, and so impart an effective forward and downward pressure on the head of the main crank.

Having now particularly described and ascertained the nature of our said invention and in what manner the same is to be performed, we declare that what we claim is—

In a stepped or swinging pedal the combination with the crank, of a cranked pedal-axle having its crank-arm journaled in said crank, and a pedal-frame rigidly connected to said pedal-axle at an acute angle to said crank-arm, substantially as described.

In witness whereof we have hereunto set our hands in presence of two witnesses.

CHARLES HILL.
FREDERICK MITCHELL.

Witnesses:
 BEDLINGTON BODYCOURT,
 W. J. S. THOMPSON.